Aug. 22, 1967 — H. R. WEISS — 3,337,237

PHYSIOTHERAPEUTIC MASSAGING APPARATUS

Filed Oct. 1, 1965

INVENTOR.
Hans R. Weiss
BY
Darby, Robertson + Vandenburgh
Attys

United States Patent Office 3,337,237
Patented Aug. 22, 1967

3,337,237
PHYSIOTHERAPEUTIC MASSAGING APPARATUS
Hans R. Weiss, 9029 Grace Ave., Niles, Ill. 60648
Filed Oct. 1, 1965, Ser. No. 492,225
7 Claims. (Cl. 280—150)

ABSTRACT OF THE DISCLOSURE

A combined safety seat belt and abdominal massaging apparatus includes a normally anchored seat belt and an electric motor with driving means engaging the seat belt near one end thereof to drive the belt in reciprocation.

---

This invention relates to human body massaging apparatus and particularly to a combined automobile safety seat belt and abdominal massaging device; that is to say, an abdominal-messaging seat belt.

The diminishing physical activity of the average person is resulting in muscular flabbiness and the development of fatty tissues, especially in the abdominal region. This condition, which is generally considered to be undesirable by reason of health and cosmetic considerations, is aggravated by the tendency of people to overindulge in food and drink. Contributing, also, to excessive midriff dimensions is the fact that many people spend a large part of their waking hours in seated position in chairs, the seats of automobiles, etc.

Corrective treatment for enlarged abdominal conditions may be either symptomatic or therapeutic. Girdles tend to hide the condition while exercise, including massage, tends to eliminate fat and improve muscle tone to effect the desired flat abdomen. While massage of the abdominal muscles is an accepted treatment, few people take the time or make the effort to avail themselves of this remedy because of the need for specialized apparatus and the amount of time required for the treatment.

The principal object of my invention is to take advantage of the many hours that people spend in automobiles and similar modes of transportation to avail themselves of abdominal massaging treatments as desired or required. This object contemplates the provision of a combined seat belt and massager which will serve at all times the intended safety function of the seat belt and which may be used as abdominal massaging apparatus as desired by the individual. More specifically, I provide a motor and associated means for driving a fastened seat belt in reciprocation whereby to massage the muscles of a person's abdomen against which it bears.

A further object is to provide an improved safety seat belt. Another, and important, object is to prevent drowsiness on the part of the driver of an automobile or similar vehicle.

These and other objects and advantages of my invention will become apparent as the description of the invention proceeds in conjunction with the accompanying drawing in which FIG. 1 is a sectional view of a portion of a typical automotive vehicle showing the apparatus of the invention installed therein;

Figure 1:
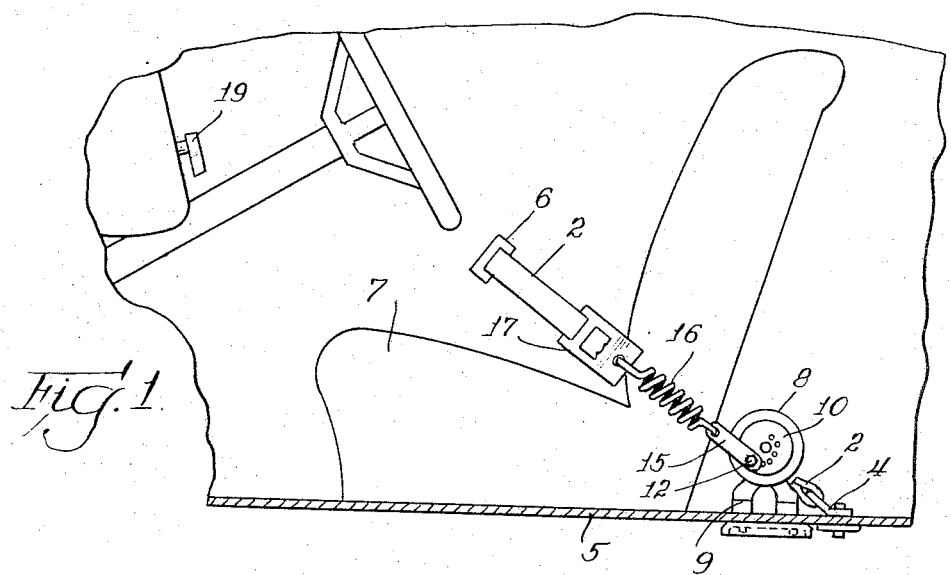

As contemplated by the invention, a safety seat belt system comprising the usual two belts 1 and 2 are respectively secured by means of anchor plates 3 and 4 to a structural frame member 5 of the automobile body or chassis. A friction buckle 6 is provided to secure the belt over the hips and lower abdominal area of a person sitting in seat 7.

The construction and arrangement of such safety seat belts are well known and in common use in automotive vehicles and passenger aircraft.

Figure 3:
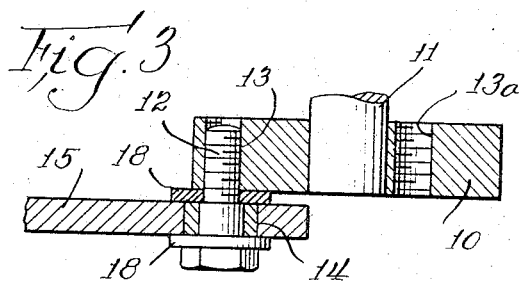
FIG. 3 is a detail view, partly in section, showing the drive connection mechanism.
Figure 2:
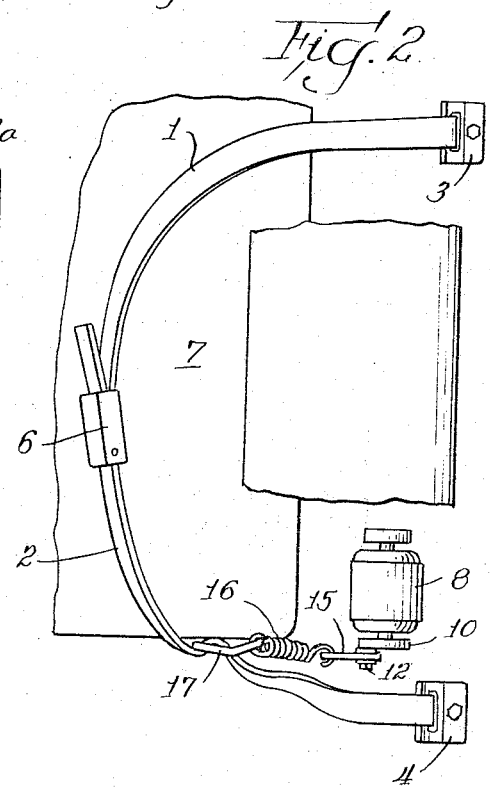
FIG. 2 is a plan view, partly in section, of a portion of the automotive vehicle showing the apparatus installed therein.

In implementing the invention, I provide means for driving the seat belt in limited amplitude reciprocating motion to provide the desired massaging action brought to bear at the lower abdominal region of the person about whom the seat belt is fastened. For this purpose, for example, an electric motor 8, designed for operation by the power source of the battery 9 (FIG. 5) of the vehicle, which may be a 6-volt or 12-volt battery, is firmly secured, preferably through rubber spacers 9, to a structural frame member of the vehicle which may be member 5 to which the seat belt is also secured. A crank plate 10 is mounted upon drive shaft 11 of the motor and this plate carries an eccentric drive pin 12. The pin may conveniently be in the form of a shoulder bolt (see FIG. 3) which is screwed into threaded hole 13 in plate 10. The bolt serves as the shaft of a bearing 14, which may be a simple bushing or may be a more sophisticated antifriction device, in one end of link 15 which, along with a relatively stiff tension spring 16 and buckle 17, transmits motion to the seat belt. Washers 18 may be inserted between link 15 and the head of bolt 12 and crank plate 10.

Buckle 17 is preferably of the type which frictionally grips strap 2 of the seat belt without weakening the seat belt. Spring 16 is sufficiently stiff to function normally as a rigid link in the operation of the massaging apparatus, the reason for supplying an extensible link being explained hereinafter.

Figure 4:
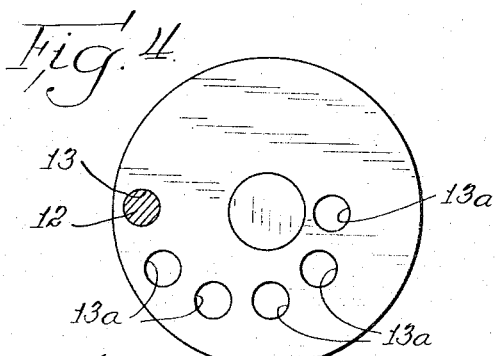
FIG. 4 is a detail view of the driving crank plate.
Figure 5:
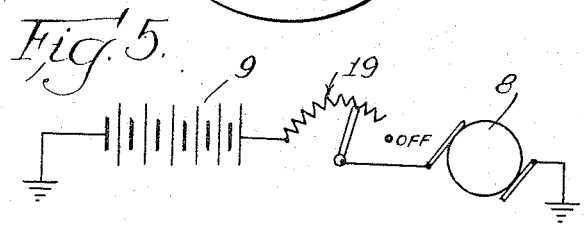
FIG. 5 is a circuit diagram showing the electrical connections of the apparatus.

The electric motor 8 is connected with the battery 9 of the vehicle through a rheostat 19 which may be conveniently mounted upon the instrument panel of the vehicle. The circuit diagram is shown in FIG. 5. As indicated, an on-off switch is combined with rheostat 19 to open or close the circuit to control the operation of the motor. By adjusting the rheostat 19, the speed of the motor is regulated to control the frequency of the massaging movement of the seat belt. If desired, a two- or three-speed switch may be used instead of a rheostat. Provision may also be made for adjustment of the amplitude of the seat belt massaging movement. For this purpose, a plurality of threaded holes 13a (FIG. 4), each having a different degree of eccentricity, may be provided for the alternative reception of the driving bolt 12. With increasing radius of eccentricity, the amplitude of the massaging motion is increased.

It will be understood that neither the existence nor the operation of the massaging driving means affects the normal and intended primary function of the seat belt; i.e., the safety function. In the event of impact of the vehicle with an obstacle, movement of the body of the user of the belt is restrained by reason of the secure anchorages of the two ends of the belt at plates 3 and 4. The motor and linkage transmission system is not intended to replace the regular seat belt anchorage. However, it does perform a useful service in the event of impact in that as a consequence of a pull on the seat belt, spring 16 is somewhat expanded before the pulling force is transmitted to the seat belt anchorage. Thus, the restraining force of the seat belt is somewhat cushioned by reason of this action of the spring.

It should be understood that the extensible link—the spring—is not indispensible to the operation of the invention. With a rigid transmission system, impact of the vehicle would result in damage to the motor and/or the associated mechanism, but ultimate reliance would still be upon the primary seat belt anchorages.

It follows from the foregoing that the driver or a passenger of an automotive vehicle whose seat is equipped with the combined seat belt massaging apparatus of the invention may activate the massager at will by closing the switch and adjusting the rheostat to the desired massaging frequency. The objective of the massaging may be physiotherapeutic or may be employed by the driver of the vehicle to dispel drowsiness. Thus, a stimulating massage may be enjoyed while traveling, obviating the necessity of the expenditure of time especially for this purpose. It is noteworthy that although prolonged ordinary riding in an automotive vehicle tends to increase midriff dimensions, this trend is completely reversed by the employment of my invention in that the massaging treatment actually rectifies such tendencies during the same traveling time.

It will be understood that the particular apparatus shown and described herein is merely an example of one possible embodiment of the invention and that many other alternative mechanical arrangements may be employed in implementing my concept of a combined safety seat belt massaging apparatus. Accordingly, the invention is not to be considered to be limited to this particular form but to encompass alternative and equivalent apparatus within the scope of the claims appended hereto.

What is claimed is:

1. A combined vehicle seat belt and abdominal massaging apparatus comprising a seat belt securely anchored at each end directly to a structural member of a vehicle, and means for driving said seat belt in reciprocation whereby to massage the abdomen of a person using said seat belt, said means including an electric motor mounted upon a structural member of the vehicle, means for gripping said seat belt near one end thereof, and means for drivingly connecting said motor to said means for gripping said seat belt.

2. A combined vehicle seat belt and abdominal massaging apparatus in accordance with claim 1 wherein said means for drivingly connecting said motor to said means for gripping said seat belt includes a transmission linkage including a tension spring, the stiffness of said spring being such that it does not expand during normal operation of the massaging apparatus but is adapted to expand and permit the direct application of force to the seat belt anchorage in the event of impact bringing the safety function of said seat belt into play.

3. A combined vehicle seat belt and abdominal massaging apparatus in accordance with claim 2 wherein said means for gripping said seat belt includes a buckle connecting the transmission linkage to the seat belt, said buckle gripping said seat belt solely by frictional engagement.

4. A combined vehicle seat belt and abdominal massaging apparatus in accordance with claim 1 wherein said driving means includes an electric battery connected to the motor and a rheostat connected to control the current from said battery to said motor and thus the speed of the motor and the frequency of reciprocation of said seat belt.

5. A combined vehicle seat belt and abdominal massaging apparatus in accordance with claim 1 and including means for adjusting the amplitude of the reciprocating motion of the seat belt.

6. A combined vehicle seat belt and abdominal massaging apparatus in accordance with claim 5 wherein the motor is a rotary motor and the adjusting means comprises a crank plate mounted upon the output shaft of said motor and a drive pin eccentrically mounted in a hole in said plate, said plate having a plurality of holes located at different radial distances from the center of said plate adapted alternatively to receive said drive pin whereby the degree of eccentricity of said drive pin may be adjusted to adjust the amplitude of reciprocation of said seat belt.

7. In a vehicle having structural members, a seat and an electric battery, in combination, a safety seat belt securely anchored at each end thereof to a structural member, a rotary electric motor mounted upon a structural member near the anchorage of one end of said seat belt, a crank plate affixed to the output shaft of said motor, a buckle frictionally engaging said seat belt near said one end of said seat belt, and a transmission linkage drivingly connecting said crank plate with said buckle to drive said belt in reciprocation upon actuation of said motor, said linkage including a tension spring, the stiffness of said spring being such that it does not expand during operation of said motor to drive said belt but is adapted to expand to permit the direct application of force to the seat belt anchorage in the event of impact bringing the safety function of said seat belt into play, said battery being electrically connected with said motor.

References Cited
UNITED STATES PATENTS

| | | | |
|---|---|---|---|
| 1,969,247 | 8/1934 | Wolcott | 128—63 |
| 2,860,630 | 11/1958 | Christensen et al. | 128—63 |
| 2,922,416 | 1/1960 | Fader | 128—57 |

BENJAMIN HERSH, *Primary Examiner.*

L. D. MORRIS, *Assistant Examiner.*